United States Patent [19]
Schnipke

[11] 3,990,731
[45] Nov. 9, 1976

[54] DUAL-PATH, MULTI-AXIS SWIVEL COUPLING FOR DISCHARGE NOZZLES

[75] Inventor: Dennis E. Schnipke, Wooster, Ohio

[73] Assignee: Premier Industrial Corporation, Cleveland, Ohio

[22] Filed: Mar. 17, 1975

[21] Appl. No.: 559,161

[52] U.S. Cl. .............................. 285/136; 285/168; 285/174; 285/181
[51] Int. Cl.² ........................................ F16L 39/04
[58] Field of Search .............. 285/136, 31, 32, 190, 285/181, 137 R, 168; 141/387, 207

[56] References Cited
UNITED STATES PATENTS

| | | | |
|---|---|---|---|
| 479,856 | 8/1892 | Suydam | 285/168 X |
| 608,192 | 8/1898 | Glazier | 285/168 X |
| 1,003,042 | 9/1911 | Forth | 285/168 X |
| 2,293,585 | 8/1942 | Bard | 285/136 |
| 2,359,846 | 10/1944 | Hayman | 285/32 |
| 2,509,119 | 5/1950 | Warren | 285/168 |
| 3,125,360 | 3/1964 | Ulrich | 285/190 X |
| 3,176,730 | 4/1965 | Knight | 285/136 X |
| 3,479,065 | 11/1969 | Bahlke et al. | 285/168 X |

Primary Examiner—Thomas F. Callaghan
Attorney, Agent, or Firm—Isler and Ornstein

[57] ABSTRACT

A swivel coupling having two independent inlets, each communicating with a separate outlet for connection to a dual-flow discharge nozzle. Both outlets swivel about a common axis relatively to the inlets and the pair of inlets are free to swivel about a common axis at right angles to the first axis. One of the inlets is "floating" so as to have both rotational and longitudinal movement for adjustably connecting it to the discharge nozzle.

12 Claims, 4 Drawing Figures

DUAL-PATH, MULTI-AXIS SWIVEL COUPLING FOR DISCHARGE NOZZLES

BACKGROUND OF THE INVENTION

Dual-flow discharge nozzles may be utilized under circumstances where two separate, independent flow paths are to be provided for the discharge of fluids which are to be maintained isolated from each other to the point of discharge. The fluids may be liquids or gases or a liquid and a gas or perhaps even a fine powder. In other cirscumstances, the dual-path discharge nozzle may be used to discharge a liquid from one port and to draw off through a second port, the volatile vapors formed by the discharge of the liquid. For example, in dispensing gasoline for automobiles at service stations, the hazards resulting from the formation of gasoline fumes can be considerably reduced and minimized by use of such a dual-path nozzle which will draw off the gasoline vapors from the tank of the vehicle at the same time that the tank is being filled with the liquid gasoline through another port of the nozzle. To accomplish this, two flexible hoses have to be connected to the nozzle; one for carrying the liquid gasoline for discharge by the nozzle, and the second for providing a suction to withdraw the fumes.

As is well known, the nozzles used in gasoline service stations must be capable of rotation or swiveling to accomodate to the various angles and positions which are required in filling the fuel tanks of vehicles. Unless some swivel connector or coupling is provided between the nozzle and the supply hose, the nozzle cannot be freely manipulated or, if manipulated, can cause kinking and damage to the supply hose. It is customary to provide such a swivel coupling between a single supply hose and the conventional discharge nozzle employed in service stations.

With the advent and increased use of the dual-flow nozzle in service stations and the necessity for connecting two hoses to the nozzle instead of the conventional single hose, the problem of preventing kinking, snarling and twisting of the hoses has become more complex and has been attempted to be solved by utilizing a conventional swivel coupling to connect the nozzle to at least one of the hoses in order to obtain at least some curtailed degree of swivel action with respect to one of the hoses. Preferably, two of such conventional swivel couplings are utilized between the nozzle and the two respective hoses so that each hose is permitted some swivel action relatively to its attachment to the nozzle, but this arrangement still does not eliminate the twisting and kinking of the hoses around and relative to each other as the nozzle is manipulated.

SUMMARY OF THE INVENTION

The invention provides a swivel coupling intermediate a dual flow nozzle and its two supply hoses which permits complete and unobstructed swivel movement of the entire nozzle relatively to the two supply hoses to which it is connected. This arrangement prevents nozzle-induced kinking or twisting of the hoses.

The invention also contemplates and provides a "floating" discharge port on the swivel coupling to serve as a connecting means between the swivel coupling and the nozzle and eliminate the need for a separate connecting union or coupling for such purpose.

The pair of inlet ports or fittings on the swivel coupling are so mounted and integrated with each other as to utilize the body of the multi-axis swivel coupling to define the swivel axis for these inlet ports and eliminate the need for any pins, rods or bolts to physically secure the inlet ports to the body of the coupling and act as pivot points. This arrangement effectively eliminates any fixed securement between the inlet ports and the body of the coupling which would establish possible zones or areas of weakness or of leakage and which would require some form of fluid-sealing means.

The invention also contemplates and provides an improved single axis swivel connector for use in conjunction with the multi-axis swivel coupling.

Other objects and advantages of the invention will be described more fully hereinafter.

DESCRIPTION OF THE PREFERRED EMBODIMENTS

Figure 1:
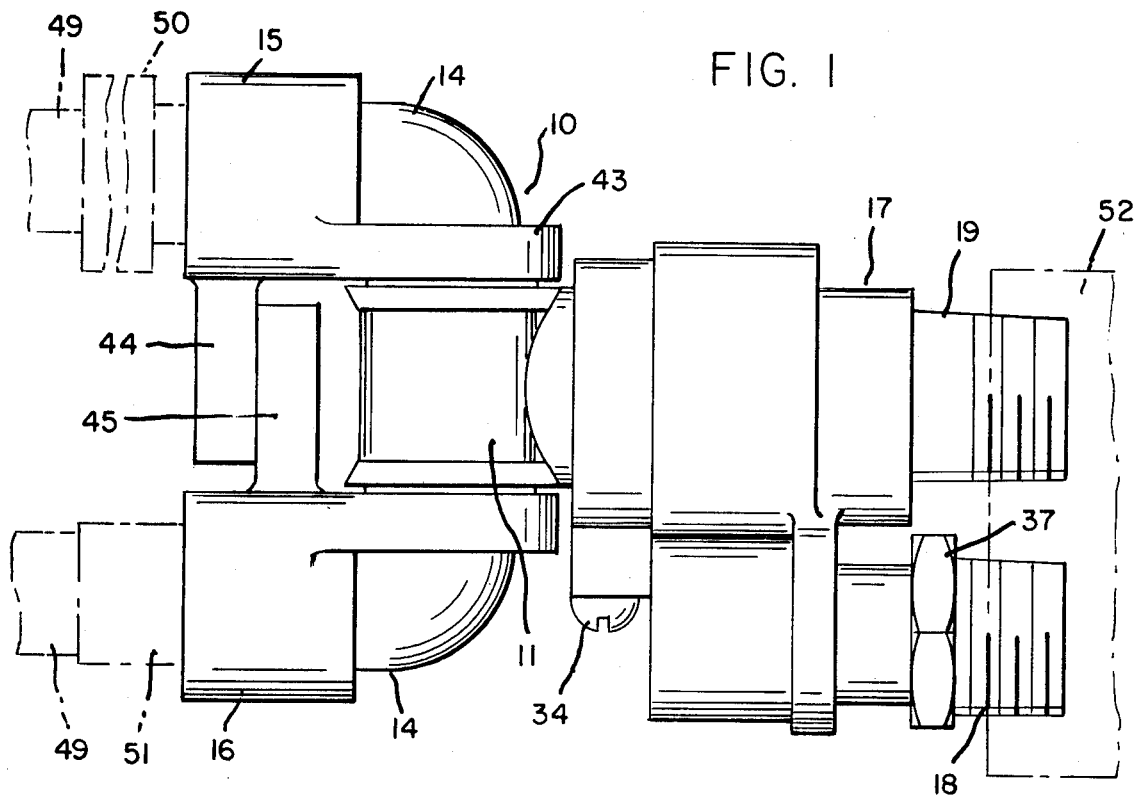
FIG. 1 is a plan view of a dual-path, multi-axis swivel coupling embodying the features of the invention and indicating in phantom outline its attachment intermediate the hoses and a dual-flow nozzle.
Figure 2:
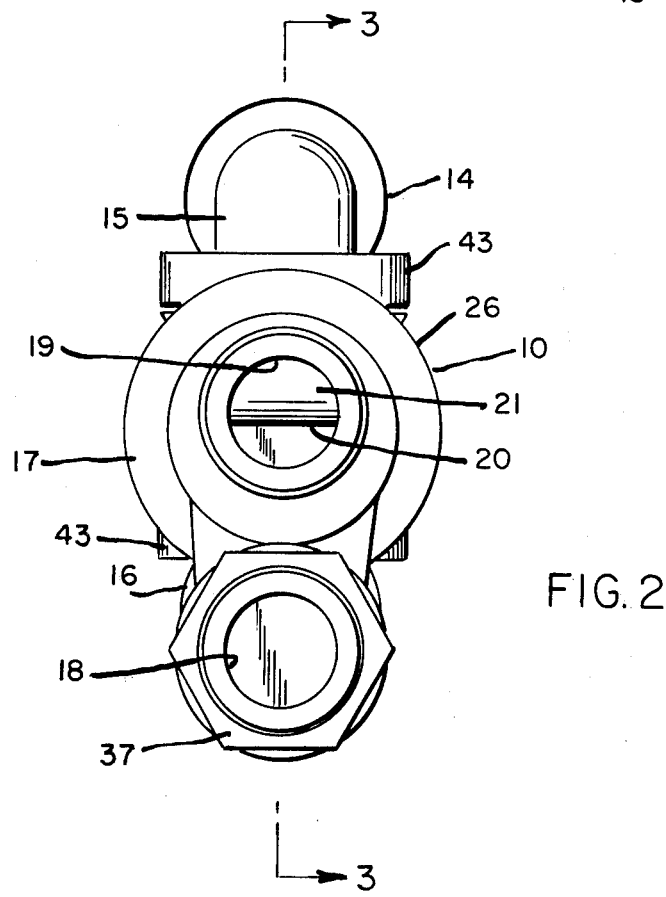
FIG. 2 is a view in elevation of one end of the swivel coupling as viewed from the righthand side of FIG. 1.
Figure 3:
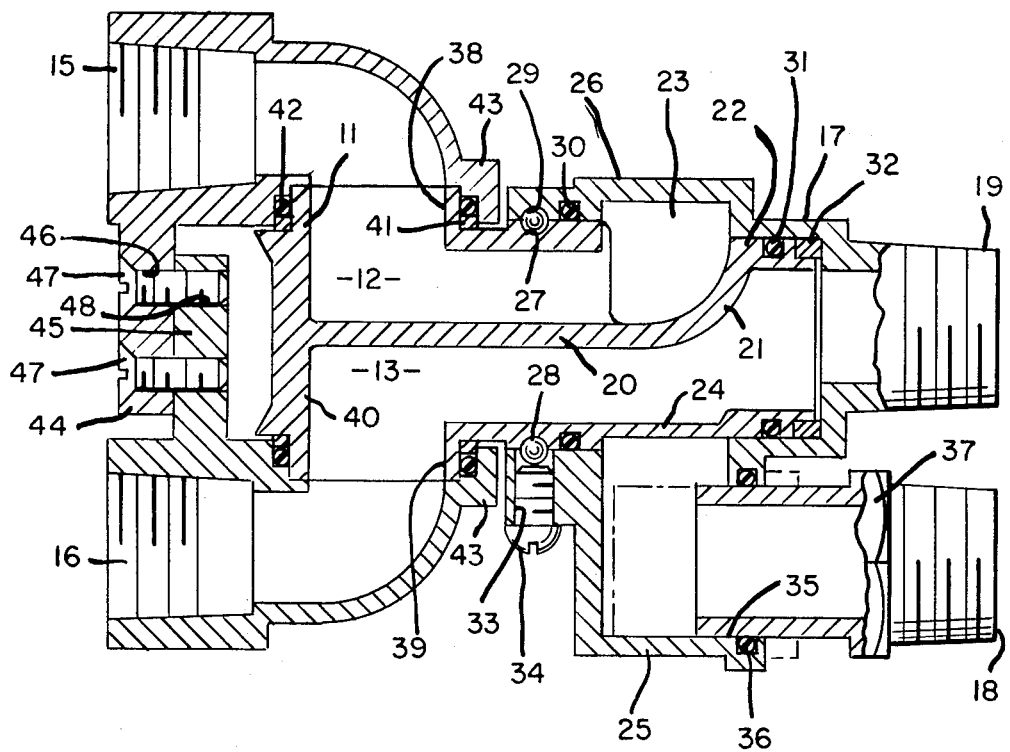
FIG. 3 is a cross-sectional view, taken as indicated on line 3—3 of FIG. 2.

Referring to FIGS. 1–3 of the drawings, there is shown a dual-path, multi-axis swivel coupling 10 which includes a body 11 having two separated fluid flow passageways 12 and 13 provided therein; an inlet assembly 14 rotatably mounted on the body 11 and presenting a pair of separated, internally threaded inlet openings or ports 15 and 16 which communicate with the flow passageways 12 and 13 respectively; and an outlet assembly 17 mounted on the body 11 for rotation about an axis at right angles to the axis of rotation of the inlet assembly 14 and presenting a pair of separated, externally threaded outlet openings or ports 18 and 19 communicating with the flow passageways 12 and 13 respectively.

As best seen in FIG. 3, the body 11 is provided with a longitudinally extending web or partition wall 20 which divides the interior of the body into the separate flow passages 12 and 13. It will be noted that toward the outlet end of the body, the web 20 is curved, as at 21, and joins an external wall portion 22 of the body which, in turn, forms part of the passageway 13 leading to the port 19 of the outlet assembly. The passageway 12 in the body is on the opposite side of the web 20 and communicates with an annular channel 23 defined between the exterior surface of another portion 24 of the body wall 22 and the interior surface of a portion 25 of the wall 26 of the outlet assembly 17.

The body 11 is provided with a circumferentially extending arcuate recess or race 27 adapted to accomodate a plurality of bearing balls 28 which project into an annular arcuate recess or race 29 in the outlet assembly 17 and serve to rotatably secure the outlet assembly 17 to the body 11. The body 11 is additionally provided with spaced circumferential recesses to accomodate seal rings 30 and 31 to provide fluid seals between the body and the outlet assembly, and to accomodate a sleeve bearing 32 which establishes a second journal area or point, spaced from the balls 28, for supporting rotation of the outlet assembly relatively to the body 11 about an axis which is substantially centrally longitudinal of the body.

In assembling the outlet assembly to the body, the seal rings 30, 31 and the sleeve bearing 32 are first put in place on the body and the outlet assembly is then slid onto the body until the companion races 27 and 29 are in alignment with each other. A small opening 33 extends from the race 29 to the exterior of the outlet assembly and provides an entry for feeding the bearing balls into operative position. After the desired quantity of balls have been inserted into the raceway, the opening 33 is plugged or closed by any suitable means, such as a screw 34. When the outlet assembly is thus mounted, its outlet opening 19 is coaxial with the axis of rotation of the outlet assembly on the body and is in communication with the flow passageway 13 regardless of the angular rotation of the outlet assembly relatively to the body.

The outlet opening 18 is in the form of a floating tube which is slidably and rotatably mounted in an opening 35 in the outlet assembly in communication with the annular channel 23 forming part of the fluid passageway 12. Thus, regardless of the angular rotation of the outlet assembly relatively to the body 11, the outlet opening 18 maintains communication with the flow passage 12. A seal ring 36 serves to prevent leakage of fluid between the outlet port 18 and the opening 35 in which it is received. A circumferentially extending hexagonal collar 37 is provided on the outlet port 18, externally of the opening 35 and serves to provide flats for applying a wrench in making connection to the discharge nozzle, as well as providing an abutment limiting the extent of inward or insertion movement of the port 18 so that it is not longitudinally displaced inwardly to a point where it bottoms and cuts off or severely restricts fluid flow through the passageway 12.

At its inlet end, the body 11 has an opening 38 and a second opening 39. The openings 38 and 39 are extensions of the passageways 12 and 13 respectively and are in a plane at right angles to the longitudinal axis of the body 11. Each of these openings is defined by an upstanding circular wall portion 40 of the body 11 on which are positioned sleeve bearings 41 and fluid seal rings 42. Each of the inlet ports 15 and 16 is substantially in the form of an elbow fitting provided with a circumferential flanged portion 43 having an internal diameter large enough to slide over and accommodate the sleeve bearing 41 about which it is free to rotate. Thereby, both inlets 15 and 16 are rotatable about a common axis which is central of the openings 38 and 39 and is at right angles to the axis of rotation of the outlet assembly.

The inlet port 15 is provided with a tab or tongue 44 which is adapted to be contiguous to and overlie a companion tab or tongue 45 which is provided on the inlet port 16. The tongue 44 is provided with a pair of countersunk openings 46 to receive machine screws 47 which are threaded into tapped openings 48 in the tongue 45. This securement unitizes the body-mounted inlet elbows 15 and 16 and prevents them from withdrawing from their rotational attachment to the body 11. It will be noted that this is accomplished without having any of the fastening or securing elements traversing or penetrating the fluid passageways so as to create the necessity for an additional seal or the possibility of an additional area of potential leakage. The joined inlet ports 15 and 16, when thus secured, move as a single unit inlet assembly and can swivel relative to both of the previously described axes of rotation.

It is to be noted that the arrangement of the web or wall 20 in the body 11 to provide the substantially in-line passageway 13 and the longitudinal passageway 12 terminating in the annular channel 23, permits the area of both of these flow passages within the body 11 to be at least equal to the area of the inlets 15 and 16, thus not diminishing fluid flow, while still maintaining an extremely compact structure for the multi-axis swivel coupling 10.

The two flexible supply hoses 49 are normally already installed at the service station pump. At least one of the hoses should be provided with a swivel connector 50 and the other hose should be provided with an externally threaded fitting 51. The swivel coupling 10 is connected to the hoses by, for example, rotating the entire coupling unit to threadedly engage either the inlet 15 or the inlet 16 with the threaded hose fitting 51; then the second hose is threadedly secured to the other inlet opening by rotation of the threaded swivel connector 50. It is expedient to connect the swivel coupling unit to the hoses in this manner if the person making the connection is relatively unskilled or if one of the hoses is already equipped with a swivel connector, as discussed above. It is to be noted however that the structural arrangement of the swivel coupling 10 permits easy withdrawal of the inlet assembly 14 by removal of the securing screws 47 so that the inlet elbows 15 and 16 can be separated from each other and can separately be rotated onto and threadedly engaged with hoses having conventional threaded hose fittings 51, without the necessity of necessarily utilizing at least one or possibly two swivel connectors 50. After the individual inlet elbows 15 and 16 are threadedly secured to their respective hoses, these elbows can be reassembled and re-secured to the body 11 of the swivel coupling 10. Thus, under proper circumstances, the need for and the expense of a swivel connector can be eliminated although this procedure is not ordinarily recommended as the swivel connector not only serves as a form of union for connection of the parts, but also serves to relieve the hose of a considerable degree of torsional stress by permitting the hose to rotate relatively to the inlet ports 15 and 16 during use of the equipment.

Before the hoses are attached as above described, a dual flow nozzle unit 52 will have been connected or attached to the outlet end of the swivel coupling 10. This is accomplished by threadedly engaging the outlet port 19 with a tapped opening in the nozzle unit by relative rotation between these two parts. During this connecting manipulation, the floating outlet port 18 can be retracted or slid inwardly relatively to the opening 35 to get it out of the path of rotation of the nozzle unit. After the nozzle unit has been threadedly sescured to the port 19, the port 18 can be threadedly secured to a second tapped opening in the nozzle unit by drawing it outwardly through the opening 35 and using a wrench or other suitable tool on the collar 37 to rotate the part 18 into threaded engagement. Thus, the floating outlet port fitting 18 permits convenient and simple assembly of the nozzle unit to the swivel coupling without the necessity for using any supplementary swivel connectors or other connecting fittings.

It will also be noted that the nozzle unit 52, when thus connected to the swivel coupling 10, serves to secure and integrate the outlet ports 18 and 19 against displacement relatively to each other and thus prevents further longitudinal movement in either direction of the port 18 relatively to the outlet assembly 17, without the need for any separate fixing or securement thereof. Thus, both the inlet assembly 14 and the outlet assembly 17 utilize the periphery of the body 11 to establish their respective axes of rotation, free of any axially located pivot elements or other securing means which intersect or traverse any of the fluid flow passageways, as is the conventional practice. By eliminating the need for such axially located pivot pins or components, the possibility of establishing additional potential leakage areas is completely eliminated and cost is reduced from the standpoint of additional machining costs and part costs, including the cost of seals which would be necessary.

The terms "inlet" and "outlet" have been used throughout this description for convenience in defining the location of the parts and distinguishing one group of parts from another in the multi-axis swivel coupling 10. As initially mentioned, a device of the type described might be utilized for dispensing gasoline through the inlet 16, the passageway 13 and the outlet 19 for discharge through one of the flow passageways of the nozzle unit 52 into the fuel tank of a vehicle. At the same time, the hose 49 which is connected to the inlet 15 would be under sub-atmospheric pressure or suction for the purpose of withdrawing volatile fumes from the fuel tank of the vehicle through the other passageway of the nozzle 52 back through outlet 18, annular passageway 23, flow passage 12 and inlet 15. Therefore, it is to be understood that the terms "inlet" and "outlet" as used herein are to be considered as convenient terms of reference and are not intended to necessarily define directions of fluid flow through the swivel coupling.

Figure 4:
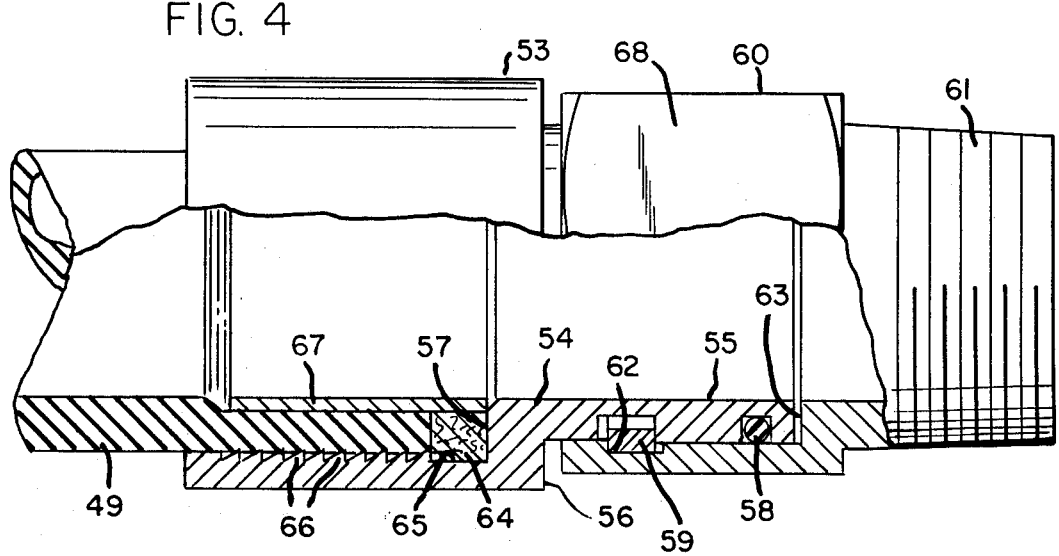
FIG. 4 is an enlarged cross-sectional view of an improved single swivel connector which may be utilized with the multi-axis swivel coupling herein disclosed.

In the preceding description, reference has been made to the use of a conventional swivel connector 50 in making the connection between the hose or hoses and the inlet assembly of the multi-axis swivel coupling. As shown in FIG. 4, an improved swivel connector 53 can be provided for this purpose and has the advantage of maintaining a full flow area throughout its length without causing any increase in its external size or diameter as compared to conventional swivel connectors.

The connector 53 includes a tubular body 54 which is offset to provide an extension 55 of reduced diameter, both externally and internally, which forms the external body shoulder 56 and an internal seat or shoulder 57.

The external surface of the extension 55 is provided with circumferential recesses to accommodate a seal ring 58 and a retaining ring 59. A tubular swivel body 60 having a threaded extension 61 of reduced diameter is sized to slip onto the extension 55 and be rotatably retained thereon by expansion of the retaining ring 59 into an annular recess 62 which is provided internally of the swivel body 60. The extension 61 defines an internal shoulder 63 which abuts or comes closely adjacent to the end of the extension 55 when the recess 62 is in alignment with the retaining ring 59.

A sealing gasket or ring 64 is mounted against the shoulder 57 of the body 54 in an annular recess 65 provided for that purpose. Extending rearwardly from the recess 65 are a plurality of annular serrations 66 which serve to engage and bite into the exterior of the flexible hose when it is inserted and secured in this end of the connector. An expansion sleeve 67 approximating the internal diameter of the hose to be connected, is provided for insertion into the end of the hose and subsequent hydraulic or mechanical expansion to compress the wall of the hose into engagement with the serrations 66.

The threaded extension 61 is freely rotatable about the longitudinal axis of the connector 53 and is utilized for threaded connection directly to a nozzle or to an intermediate component, such as a previously described swivel coupling 10. It will be understood that flats 68 may be provided on the exterior surface of the swivel body 60 to permit utilization of a wrench or other tool for rotating the swivel body for threaded engagement with the part to which it is to be connected.

It will be noted that the flow passageway through the swivel connector 53 has a uniform area throughout in contrast to the prior art form of connectors utilizing an externally mounted snap ring against the end of an externally threaded element which is intended to serve the same function as the swivel body 60. In order to maintain a uniform flow area through the prior art swivel connector, it is necessary to enlarge the diameter of the threaded part, thus increasing the size and bulk of the swivel connector. Conversely, if such an increase in size is not acceptable, then the flow passage of the connector must be restricted. This problem is not encountered in the structure for the swivel connector 53, as illustrated in FIG. 4, as a full, unrestricted and uniform flow area is maintained without any corresponding overall size increase in the unit.

It is to be understood that the forms of my invention, herewith shown and described, are to be taken as preferred examples of the same, and that various changes in the shape, size and arrangement of parts may be resorted to, without departing from the spirit of my invention, or the scope of the subjoined claims.

I claim:

1. A dual flow path, multi-axis swivel coupling, comprising a body partitioned to provide two separate fluid flow passageways isolated from each other, an inlet assembly carried by said body and journaled solely by the periphery of said body for rotation thereabout on a first axis, an outlet assembly carried by said body and journaled solely by the periphery of said body for rotation thereabout on a second axis substantially normal to said first axis, said inlet assembly having two separate inlet ports isolated from each other, said outlet assembly having two separate outlet ports on the same end of the body and isolated from each other, one of said outlet ports having a longitudinal axis coaxial with said second axis of rotation, the other of said outlet ports having a longitudinal axis parallel to and spaced radially from the longitudinal axis of said one outlet port whereby said other outlet port is movable orbitally about said one outlet port in response to relative rotation of said outlet assembly on said body, one pair of inlet and outlet ports maintaining continuous communication with one of said passageways during relative rotation of said ports about said axes of rotation, and the other pair of inlet and outlet ports maintaining continuous communication with the other of said passageways during relative rotation of said ports about said axes of rotation.

2. A swivel coupling as defined in claim 1, wherein said inlet assembly includes two separable parts, each one of said parts providing one of said inlet ports and being unsecured to said body when separated from the other of said parts, and means for removably securing said parts to each other for integrated rotational movement on said body, said means maintaining said parts against withdrawal from said body.

3. A swivel coupling as defined in claim 2, wherein each of said parts of said inlet assembly is threaded for attachment to a non-rotatable hose fitting and is separately removable from said body for rotating it into threaded engagement with such hose fitting.

4. A swivel coupling as defined in claim 1, wherein each of said fluid flow passageways has a cross-sectional area at least equal to the cross-sectional area of the inlet port having communication therewith.

5. A swivel coupling as defined in claim 1, wherein said outlet assembly includes one fixed outlet port and one movable outlet port spaced from said fixed port and mounted for rotation about its own longitudinal axis in said outlet assembly, both of said outlet ports being threaded for attachment to a unitary dual flow discharge unit, and said movable outlet port being threadedly engageable with such discharge unit without effecting relative rotation between said outlet assembly and said discharge unit.

6. A swivel coupling as defined in claim 5, wherein said movable outlet port is axially slidable into and out of said outlet assembly to adjustably position it longitudinally for said threaded engagement with said discharge unit.

7. A swivel coupling as defined in claim 6, wherein said securement of said outlet ports to said discharge unit secures said movable outlet port against axial withdrawal from said outlet assembly.

8. A dual flow path, multi-axis swivel coupling, comprising a body partitioned to provide two separate fluid flow passageways isolated from each other, an inlet assembly carried by said body for rotation relatively thereto about a first axis, said inlet assembly providing two inlet ports maintaining continuous communication with said passageways, an outlet assembly carried by said body for rotation relatively thereto about a second axis substantially normal to said first axis, said outlet assembly providing two outlet ports maintaining continuous communication with said passageways, both of said outlet ports being threaded for attachment to a unitary dual flow discharge unit, one of said outlet ports being fixed on said outlet assembly, and the other of said outlet ports being movably mounted on said outlet assembly for threaded engagement with said discharge unit without effecting relative rotation between said discharge unit and said outlet assembly.

9. A swivel coupling as defined in claim 8, wherein said movable outlet port is mounted for rotation about its own longitudinal axis in said outlet assembly.

10. A swivel coupling as defined in claim 9, wherein said movable outlet port is axially slidable into and out of said outlet assembly to adjustably position it longitudinally for said threaded engagement with said discharge unit.

11. A swivel coupling as defined in claim 8, wherein said inlet ports are threaded for attachment to a non-rotatable hose fitting, and including a swivel connector secured to at least one of said inlet ports for effecting attachment thereof to such hose fitting without relative rotation between said inlet assembly and such hose fitting.

12. A dual flow path, multi-axis swivel coupling, comprising a body partitioned to provide two separate fluid flow passageways isolated from each other, an inlet assembly carried by said body and journaled solely by the periphery of said body for rotation thereabout on a first axis, an outlet assembly carried by said body and journaled solely by the periphery of said body for rotation thereabout on a second axis substantially normal to said first axis, said inlet assembly having two inlet ports isolated from each other, said outlet assembly having one fixed outlet port and a separate movable outlet port spaced from said fixed port and mounted for rotation about its own longitudinal axis in said outlet assembly, both said outlet ports being threaded for attachment to a unitary dual flow discharge unit, said movable outlet port being threadedly engageable with such discharge unit without effecting relative rotation between said outlet assembly and said discharge unit, one pair of inlet and outlet ports maintaining continuous communication with one of said passageways during relative rotation of said ports about said axes, and the other pair of inlet and outlet ports maintaining continuous communication with the other of said passageways during relative rotation of said ports about said axes.

* * * * *